Sept. 18, 1951 W. J. REDMOND ET AL 2,568,302

INNER GUIDE FOR VISIBLE INDEX SYSTEMS

Filed Sept. 15, 1948 3 Sheets-Sheet 1

INVENTORS.
William J. Redmond
BY Edward L. Sayers
Sheridan, Davis & Cargill
Attorneys Sept. 18, 1951 W. J. REDMOND ET AL 2,568,302

INNER GUIDE FOR VISIBLE INDEX SYSTEMS

Filed Sept. 15, 1948 3 Sheets-Sheet 2

INVENTORS.
William J. Redmond
Edward L. Sayers
BY Sheridan, Davis & Cargill
Attorneys

INNER GUIDE FOR VISIBLE INDEX SYSTEMS

Filed Sept. 15, 1948 3 Sheets-Sheet 3

INVENTORS.
William J. Redmond
Edward L. Sayers
BY Sheridan, Davis & Cargill
Attorneys Patented Sept. 18, 1951 2,568,302

UNITED STATES PATENT OFFICE 2,568,302

INNER GUIDE FOR VISIBLE INDEX SYSTEMS

William J. Redmond, Cedar Rapids, Iowa, and Edward L. Sayers, Griffin, Ga.

Application September 15, 1948, Serial No. 49,408

3 Claims. (Cl. 129—16.7)

This invention relates to visible index systems and particularly to an improved inner guide therefor.

The majority of visible index systems comprise:

*a.* Main guides bearing tabs indicating general classifications, such as alphabetical groups;

*b.* One or more inner guides indicating subclassifications, such as specific names within the above-mentioned alphabetical groups (there is a separate inner guide for each main guide); and

*c.* Individual record cards for each of the subclassifications listed on the corresponding inner guide.

The guides and cards will usually be disposed vertically, on edge, in a tray or drawer.

One specific example of a visible index system is that used for bank depositors' accounts and it may be described as follows: First, there is a main guide carrying an upstanding tab marked, for example, "Aa—Ad." Just behind this first main guide are one or more inner guides each carrying, on numbered lines, the names of depositors included in the Aa—Ad classification. Following each inner guide are a number of individual ledger cards, one for each depositor listed on the corresponding inner guide. Each card will have a numbered tab aligned with the like-numbered line on the inner guide bearing the corresponding depositor's name. Similar combinations of main guides, inner guides and individual record cards throughout the entire range A through Z will complete the system.

A conventional inner guide comprises a sheet having numbered diagonal lines at or near one edge. Space is usually provided for a list of 10 to 20 names or so on each inner guide and these are typed or written directly thereon. Thus, in the conventional system, when it is necessary to take a name off the guide or replace it by another, an entirely new guide must be prepared which involves retyping or rewriting the entire list of names. This is one of the weaknesses of conventional visible index systems in that much time is wasted in this repetitious preparation of new inner guides. Furthermore, the cost of using an entirely new guide, just to replace one name, is exorbitant in systems where such changes must be made at frequent intervals.

Accordingly, an important object of the present invention resides in the provision of an inner guide for a visible index system in which the individual names or other sub-classifications may be renewed, replaced or re-arranged at will merely by re-typing one or more names on a slip of paper insertable in a viewing position on the inner guide, thereby avoiding the necessity of using an entirely new guide each time.

An important feature of the present invention is that individual formations such as slots may be provided for individual name-carrying slips or cards so that replacement of a single name involves merely replacement of a single slip or card carrying that name. The main part of the inner guide of the present invention, therefore, may be re-used indefinitely.

Another important advantage of the improved guide is that colored, transparent strips may conveniently be placed in a particular slot, over the name card therein, to "flag" a particular item, as for example to indicate that a particular depositor's account is overdrawn, or that a particular item is in short supply, etc.

Other objects and advantages will be apparent from the following description taken in connection with the drawings in which.

Figure 2:
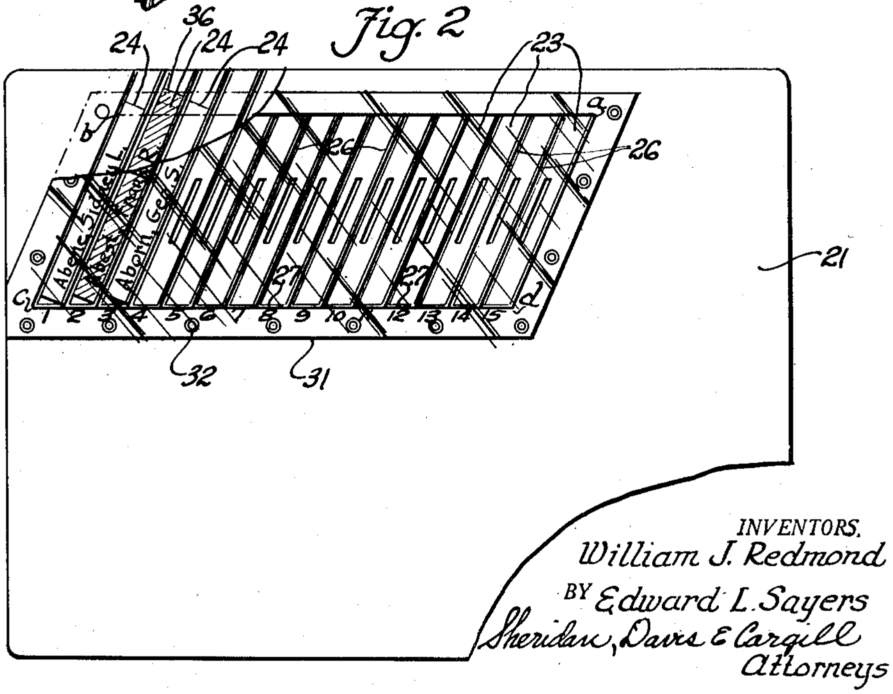
Fig. 2 is an enlarged front view of the inner guide shown in Fig. 1.
Figure 3:
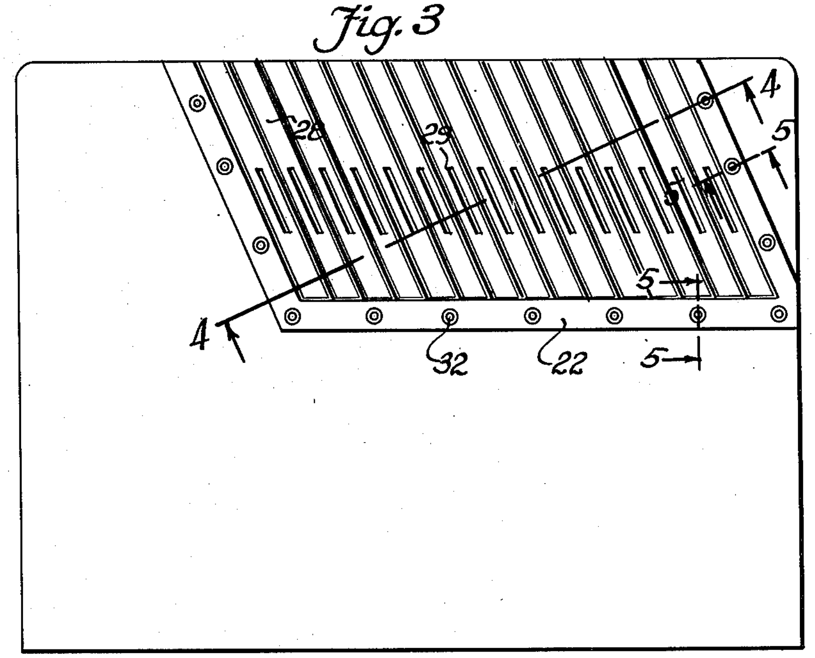
Fig. 3 is a rear view of Fig. 2.
Figure 4:
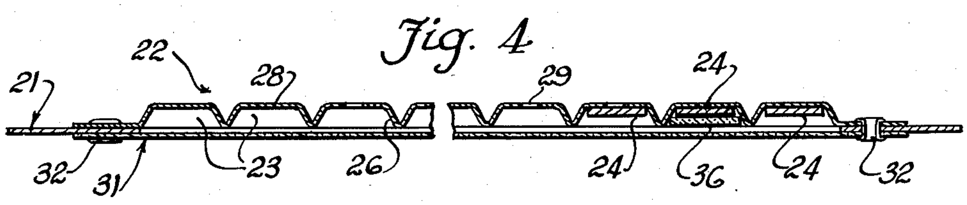
Fig. 4 is a sectional view of Fig. 3 taken along the line 4—4.
Figure 6:
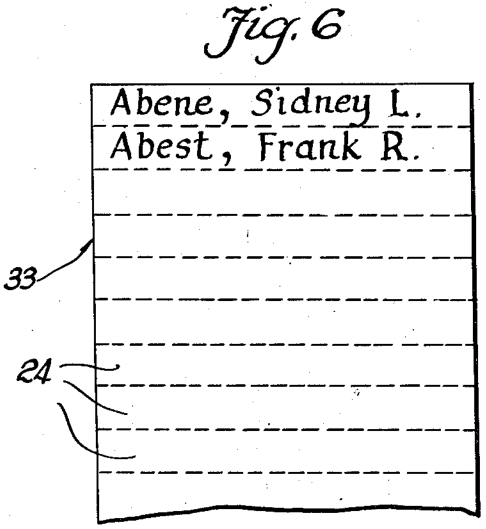
Figure 4A:
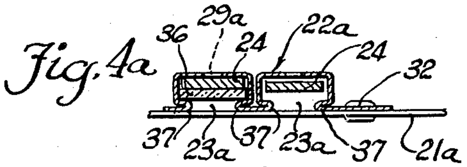
Figure 5:
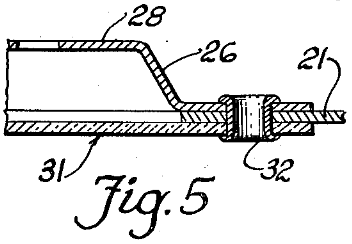
Figure 7:
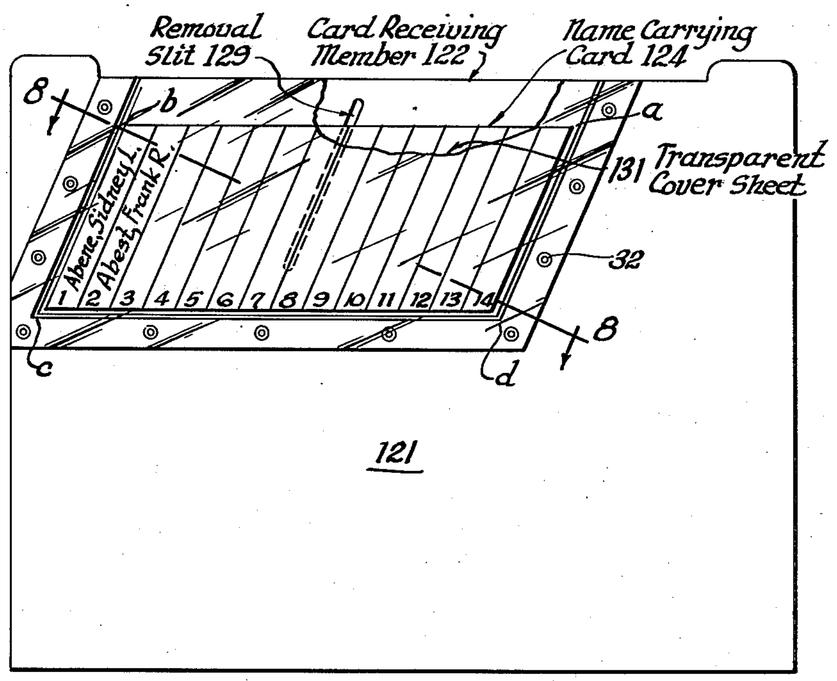
Figure 8:
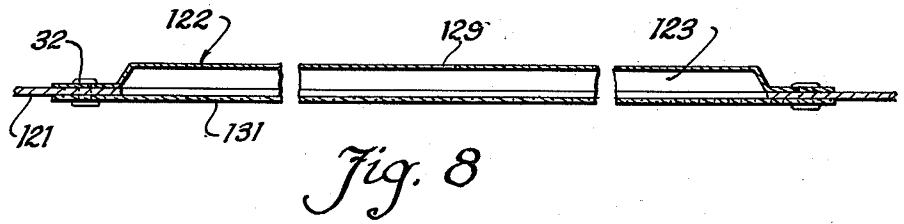
Figure 9:
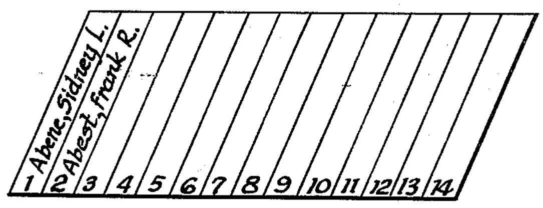

Fig. 4*a* is a fragmentary view of a modified form of the invention, shown in section, similar to Fig. 4;

Fig. 5 is a fragmentary sectional view of Fig. 3 taken along the line 5—5;

Fig. 6 is a view of a sheet perforated to define a number of individual name slips or cards which may be used in connection with the improved inner guide;

Fig. 7 is a view, similar to Fig. 2 of a modified form of an inner guide according to the present invention;

Fig. 8 is a fragmentary, sectional view of Fig. 7, taken along the line 8—8; and Fig. 9 is a card, with space for a plurality of names, usable with the inner guide of Figs. 7 and 8.

Figure 1:
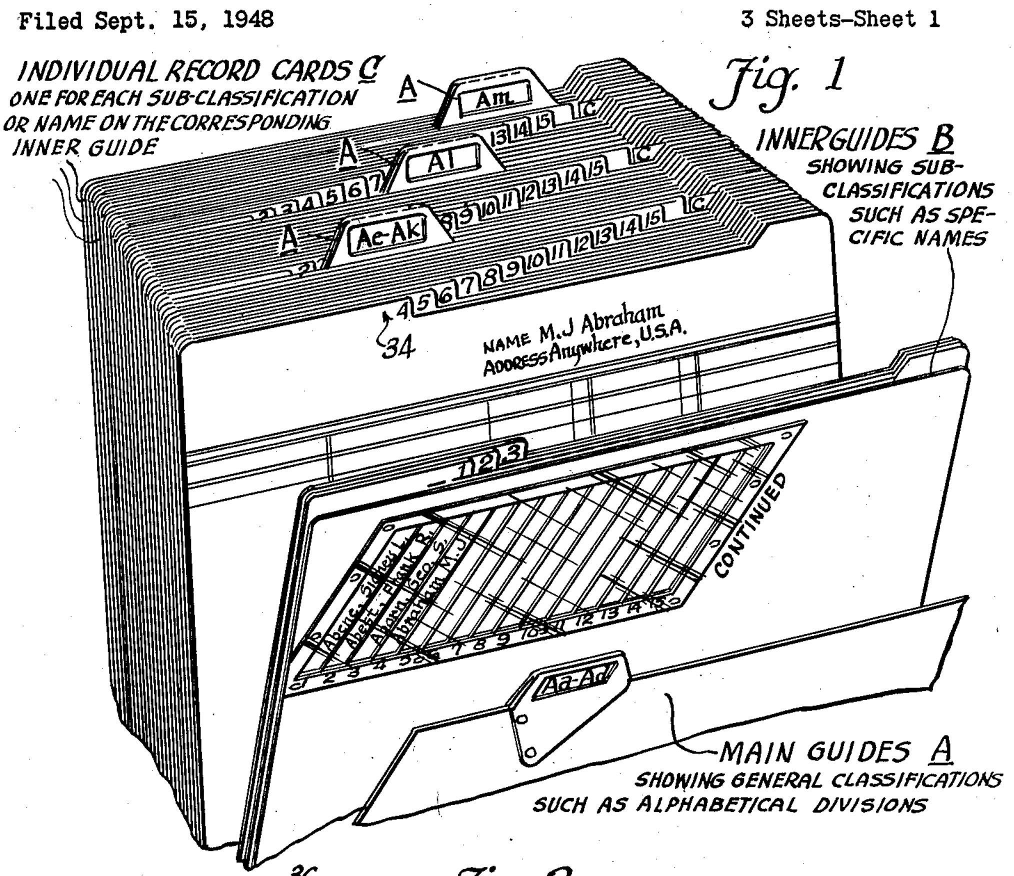
Figure 1 is a perspective view of a portion of a visible index system illustrating one embodiment of the improved inner guide.

Referring now more particularly to the embodiment of the present invention shown in the drawings, Fig. 1 illustrates a portion of a visible index system such as might be applied to a bank depositors' ledger. The system includes a number of main guides designated A indicating depositors' names broken down into main alphabetical classifications, Aa—Ad, Ae—Ak, Al, Am, etc. Behind each main guide A is an inner guide B forming the subject of the present invention and having in this case provision for fifteen depositor names. Behind each inner guide in the specific example shown are a maximum of 15 cards designated C, one for each depositor's name carried on the immediately preceding inner guide.

As best shown in Figs. 2, 3, 4 and 5, each inner guide comprises a support sheet 21 of cardboard, fibre or the like having a rhombic window *abcd* formed therein. On the rear surface is positioned a member 22 formed of sheet metal such as aluminum or other preferably light-weight material and having formed therein a plurality (in this case fifteen) of individual, diagonal, aligned, elongated recesses or formations 23 for receiving individual name cards 24, these formations being separated by walls 26 and enclosed at the bottom by end walls 27. The back wall 28 of each recess or slot 23 is provided with an elongated slit 29 for insertion of a tool such as a pin or paper clip to facilitate removal of name slips or cards from the recesses. The card-carrying member 22 is positioned on the backside of the supporting sheet 21 with its open side facing forwardly, overlapping the rhombic window *abcd* on all four sides of the latter, and having its upper edge preferably coinciding substantially with the upper edge of the sheet.

On the forward surface of the sheet 21 is positioned a substantially rhombic-shaped transparent cover 31 preferably comprising a flexible plastics sheet such as polymerized methyl methacrylate ("Lucite") or the like. It provides a convenient means for holding the name-cards in their individual slots and at the same time keeping them clean and in sight. For convenience and economy, the sheet 21, member 22 and cover 31 are assembled in the relative positions shown by rivet means 32 which are spaced marginally about the window *abcd*.

Thus, in the assembled inner guide, as shown, individual slot formations or recesses 23 having open top ends are provided for the reception of individual cards or slips 24 bearing individual names or other appropriate indicia. Such slips may be conveniently made, for example, by typing or writing upon a perforated sheet, such as generally designated 33 in Fig. 6, from which may be torn individual name-bearing slips 24. These slips are then inserted in a desired one of the slots 23.

At the bottom of the window *abcd*, on the front surface, the individual slots 23 are numbered 1 to 15, as shown. As will be seen by reference to Fig. 1 the individual depositor's record cards C are correspondingly numbered on tab portions 34 which are progressively staggered from left to right to provide for alignment of the card numbers with the same numbers on the corresponding inner guide B. Thus, to select a particular depositor's record card, as for example M. J. Abrahams' in Fig. 1, this is quickly done by noting the number 4 corresponding to that name and then selecting record card number 4 immediately following.

While the inner guide of the present invention has been illustrated in connection with a bank depositors' ledger, it will be apparent that it may be usefully applied to a system of indexing in visible form, records of any nature by straight systems involving straight numerical, straight alphabetical or by combined alphabetical and numerical classifications, as well as any other visible index systems using names, codes, sizes, dimensions, subjects, classifications, locations, legal descriptions, cross-references and other classification indicia. Furthermore, while I have illustrated an inner guide having fifteen recesses for name slips, any other number which is convenient or desirable may be employed. While the names or other sub-classifications are probably disposed diagonally on the inner guide as shown to facilitate reading them, as well as to provide ample room for long names, it may, in some cases, be desired to dispose the names vertically on the guide in order to include a maximum number across the guide.

To "flag" a particular name or sub-classification so that it will stand out and attract the user's attention, colored transparent strips such as designated 36 (Figs. 2 and 4) may be placed in the recesses in front of the name slip. This is useful in a bank depositors' ledger system for indicating an overdrawn account, for example, or in a production control system for indicating a part that may be in short supply.

Fig. 4*a* illustrates a modification of the form of the invention shown in Fig. 4, and shows another means, besides the transparent cover sheet 31, for holding the individual name-carrying and "flagging" cards in their respective slots. In Fig. 4*a* the mounting sheet **21*a* (corresponding to 21) has mounted on one side thereof a member 22*a* (corresponding to 22) formed with a number of recesses 23*a*, each of which is adapted to receive a name-carrying card 24 and, where desired, a flagging card 36. The forward portions of each formation is constricted to form a pair of vertical lips 37**, spaced less than the width of a card, to hold the cards within said formations.

Another embodiment of the invention is shown in Figs. 7, 8 and 9 and is substantially the same as that shown in Figs. 1, 2, 3, 4, 5 and 6 except that the card receiving member 122 is provided with a single card-receiving recess or pocket (instead of a plurality) and the card 124 is large enough to contain a plurality of names (instead of a single name). This embodiment will be useful in applications where it is desired to place all names on a single sheet and insert or remove them as a unit.

The sheet 121 is formed with a window *abcd* adjacent its upper edge. On the back side is the metal or fiber card receiving member 122 having a single card receiving pocket or formation 123 formed therein for receiving a card 124 which in this case is rhombic-shaped but may be rectangular-shaped if desired.

The card 124 is insertable into and removable from the pocket in the direction of window edges *ad* and *bc*. A single removal slit 129 is provided in member 122, elongated, as shown in the direction of movement of the card into and out of the pocket. As in the previously described embodiment, the card receiving member 122 and a front, transparent cover sheet 131 are mounted on the sheet 121 as by rivets 32.

While particular forms of the present invention have been shown, it will be apparent the minor changes therein will readily suggest themselves to others skilled in the art without departing from the spirit and scope of the invention.

We claim:

1. A guide for a visible index system comprising a sheet having a window therein, a member having a plurality of individual card-receiving formations mounted at one side of said window, and a transparent cover mounted on the opposite side of the window through which cards insaid formations are visible, said member having an elongated slit formed to provide access to each of said formations to facilitate the removal of cards therefrom.

2. A guide for a visible index system comprising a sheet with a window formed therein; a card carrying member positioned on the rear surface of said sheet overlapping said window and having its upper edge substantially flush with the upper edge of the sheet, said member having a plurality of individually aligned, elongated, open-fronted recesses formed therein, each recess having an open end portion terminating substantially at the upper edge of said sheet, a flat cover of flexible, transparent material positioned on the front surface of said sheet overlapping said window, rivet means positioned marginally of said window and extending through said sheet, member, and cover to hold the parts assembled, said member having an elongated slit formed therein at each of said recesses to permit insertion of a tool for removing cards from said recesses.

3. A guide for a visible index system comprising a sheet with a window formed therein; a card carrying member positioned on the rear surface of said sheet in registration with said window and having its upper edge substantially flush with the upper edge of the sheet, said member having a plurality of individually aligned, elongated, open-fronted recesses formed therein, each recess having an open end portion terminating substantially at the upper edge of each sheet, transparent means extending along the open front of each of said recesses to hold cards therein, said member having an elongated slit formed therein at each of said recesses and parallel to said recesses to permit insertion of a tool for removing said cards from said recesses.

WILLIAM J. REDMOND.
EDWARD L. SAYERS.

REFERENCES CITED

The following references are of record in the file of this patent:

UNITED STATES PATENTS

| Number | Name | Date |
|---|---|---|
| 1,150,034 | Hub | Aug. 17, 1915 |
| 1,448,323 | Wood | Mar. 13, 1923 |

FOREIGN PATENTS

| Number | Country | Date |
|---|---|---|
| 187,804 | Great Britain | Nov. 2, 1922 |
| 340,669 | Great Britain | Jan. 8, 1931 |
| 70,919 | Norway | Apr. 5, 1944 |